(12) United States Patent
Sim et al.

(10) Patent No.: US 7,436,438 B2
(45) Date of Patent: Oct. 14, 2008

(54) DIGITAL STILL CAMERA AND METHOD OF FORMING A PANORAMIC IMAGE

(75) Inventors: Wong Hoo Sim, Singapore (SG); Teck Tian Willie Png, Singapore (SG); Lan Eng Poh, Singapore (SG); Hon Keat Pong, Singapore (SG); Toh Onn Desmond Hii, Singapore (SG)

(73) Assignee: Creative Technology Ltd., Singapore (SG)

( * ) Notice: Subject to any disclaimer, the term of this patent is extended or adjusted under 35 U.S.C. 154(b) by 751 days.

(21) Appl. No.: 10/802,446

(22) Filed: Mar. 16, 2004

(65) Prior Publication Data

US 2005/0206743 A1 Sep. 22, 2005

(51) Int. Cl.
*H04N 5/225* (2006.01)

(52) U.S. Cl. .................................... 348/218.1; 348/239

(58) Field of Classification Search ............... 348/36, 348/218.1, 239
See application file for complete search history.

(56) References Cited

U.S. PATENT DOCUMENTS

| | | | | |
|---|---|---|---|---|
| 6,243,103 B1 * | 6/2001 | Takiguchi et al. | ............ | 345/634 |
| 6,466,262 B1 * | 10/2002 | Miyatake et al. | ............ | 382/284 |
| 6,714,249 B2 * | 3/2004 | May et al. | .................. | 348/373 |
| 6,885,392 B1 * | 4/2005 | Mancuso et al. | ............... | 348/36 |
| 2001/0026684 A1 * | 10/2001 | Sorek et al. | .................. | 396/322 |
| 2003/0095193 A1 * | 5/2003 | May et al. | ................. | 348/231.3 |
| 2004/0233274 A1 * | 11/2004 | Uyttendaele et al. | .......... | 348/36 |
| 2006/0215038 A1 * | 9/2006 | Gruber et al. | ............ | 348/218.1 |

FOREIGN PATENT DOCUMENTS

EP 0884897 12/1998
WO WO 99/17543 4/1999

* cited by examiner

*Primary Examiner*—James M Hannett
(74) *Attorney, Agent, or Firm*—Blakely, Sokoloff, Taylor & Zafman LLP (57) ABSTRACT

A system for forming a panoramic image, the system comprising:
(a) a digital still camera for taking still images and having a panoramic mode for creating a panoramic image, the camera comprising a photographic imaging system for capturing a plurality of still photographic images used to form the panoramic image;
(b) a transfer module for receiving the plurality of still photographic images to be automatically stitched together to form the panoramic image, the transfer module comprising a processor;
(c) the processor being for automatically processing the plurality of still photographic images to automatically form the panoramic image, the processor comprising a stitching engine to automatically form the panoramic image; and
(d) a memory for storing at least one of the panoramic image and the plurality of still photographic images.

35 Claims, 6 Drawing Sheets

(Prior Art)

Figure 4

(Prior Art)

DIGITAL STILL CAMERA AND METHOD OF FORMING A PANORAMIC IMAGE

FIELD OF THE INVENTION

This invention relates to a digital still camera and a method for forming a panoramic image, and refers particularly, though not exclusively, to a digital still camera where a panoramic image is automatically formed, and a method for automatically forming a panoramic image using such a camera.

BACKGROUND TO THE INVENTION

A common method of taking a panoramic image with a digital still camera is for the user to use the digital still camera to take multiple overlapping images, transfer them to a computer, process them on the computer and to stitch them together using a stitcher such as, for example, Apple's "QuickTime VR".

In the capturing stage, the user typically needs to fix the exposure, white balancing, and focus, to ensure colour consistency. This can be simplified by having a "panoramic mode", which is commonly available in many digital still cameras. The user decides on the orientation of the camera, whether landscape or portrait, and also whether to pan the camera left or right. The relevant instructions are input to the camera. Next, the user operates the camera to take multiple overlapping snapshots with appropriate overlap. The responsibility of ensuring there is sufficient overlap lies with the user. The process requires the user to pause between each shot to perform framing. Some cameras provide visual assistance for framing the next panoramic image by displaying part of the previous snapshot. Although it removes most of guesswork, the user will still need to stop and perform manual framing for each shot, which is relatively disruptive compared to taking a single snapshot.

Figure 3:
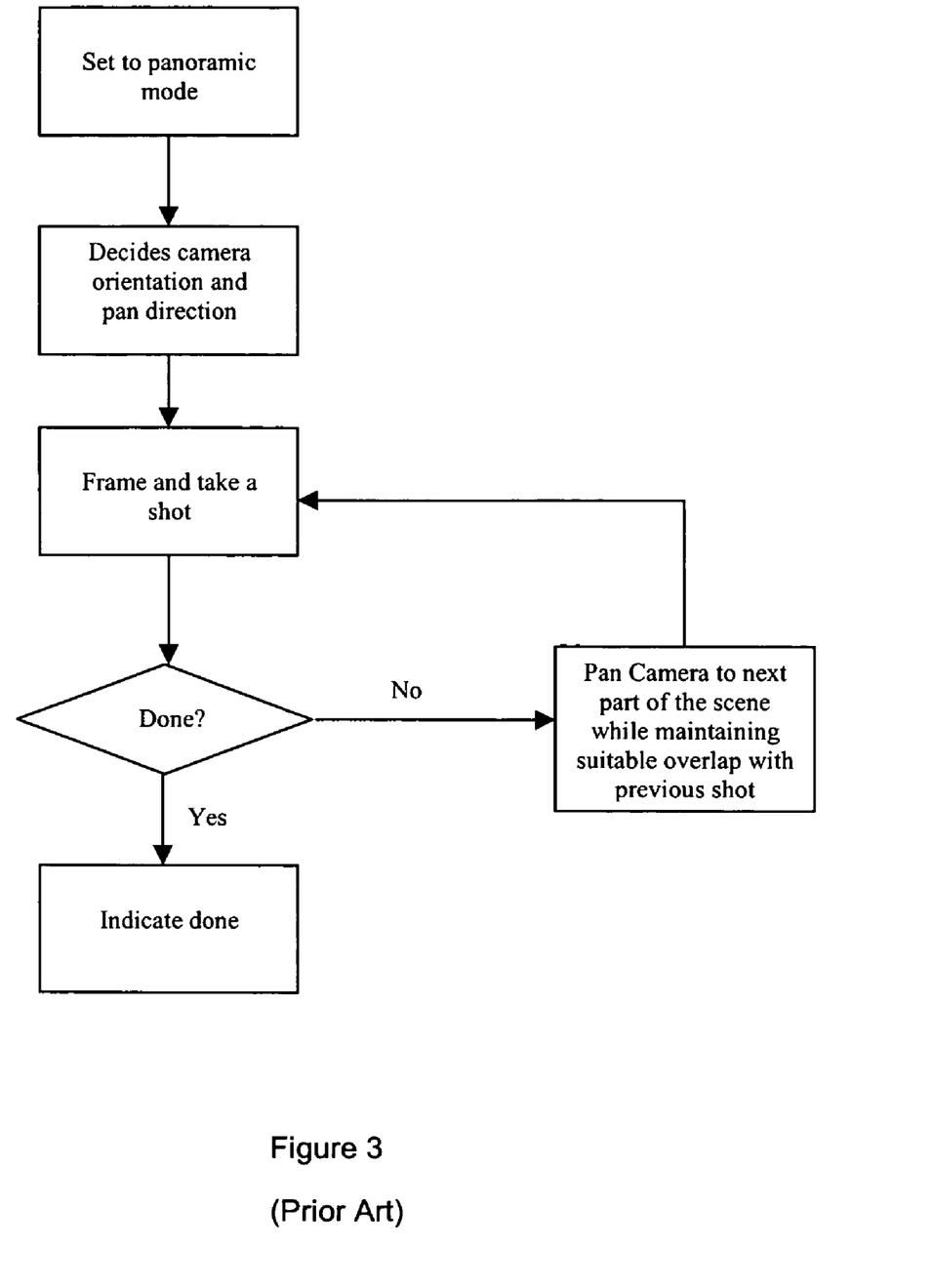
FIG. 3 is a flow chart of a known prior art process for capturing images before creating a panoramic image.
Figure 4:
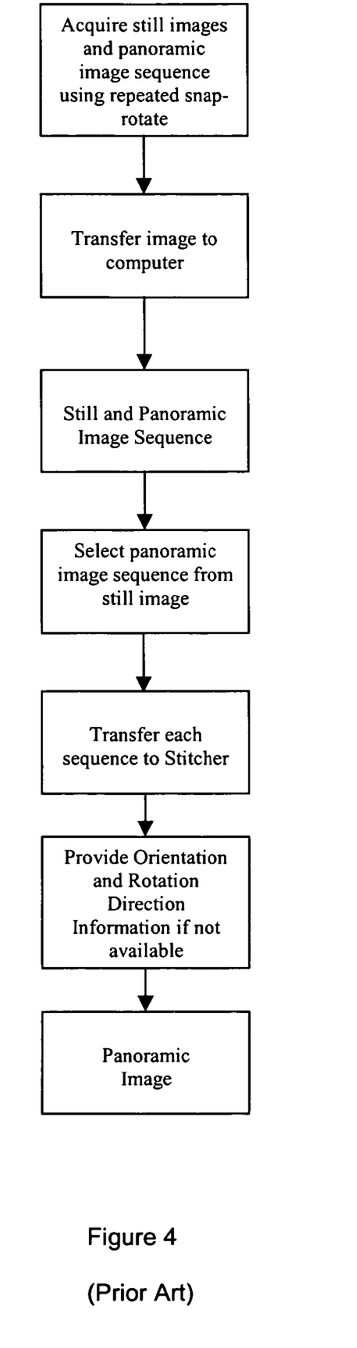
FIG. 4 is a flow chart of a known prior art process for creating a panoramic image on a computer.

Next, in the stitching stage, the user typically transfers all the images to a computer, and manually selects panoramic sequences from a mixture of panoramic and still snapshots. The panoramic image sequences are brought into a stitching application for stitching one at a time. The user may also need to provide the orientation and pan direction information to the stitcher. The result of the stitching process is a panoramic image. Although most stitchers are fully automatic, the process of sorting and searching snapshots for panoramic image sequence for stitching adds unnecessary work. This is illustrated in FIGS. 3 and 4.

There has been proposed to use the "movie" mode of more advanced digital cameras to capture many images and to use those images to form a panoramic image. By using "movie" mode, a large number of images are taken (normally 30 per second) so there should always be adequate overlap. Most users take several seconds to pan a large panorama, so such cameras can capture over 200 images for one panoramic image. This requires very powerful, and fast, processing and significant memory. As such only very powerful digital cameras can be used, and such cameras are very expensive. In addition, the image resolution in movie mode is typically much smaller than in still image mode.

SUMMARY OF THE INVENTION

In accordance with a preferred form there is provided a digital still camera for taking still images and having a panoramic mode for creating a panoramic image, the camera comprising: a photographic imaging system for capturing a plurality of still photographic images used to form the panoramic image; a transfer module for receiving the plurality of still photographic images to be automatically stitched together to form the panoramic image; a processor for automatically processing the plurality of still photographic images to automatically form the panoramic image; and a memory for storing at least one of the panoramic image and the plurality of still photographic images.

Preferably, the processor comprises a stitching engine to automatically form the panoramic image; and the transfer module comprises the processor.

In accordance with another form there is provided a system for forming a panoramic image, the system comprising:
(a) a digital still camera for taking still images and having a panoramic mode for creating a panoramic image, the camera comprising a photographic imaging system for capturing a plurality of still photographic images used to form the panoramic image;
(b) a transfer module for receiving the plurality of still photographic images to be automatically stitched together to form the panoramic image, the transfer module comprising a processor;
(c) the processor being for automatically processing the plurality of still photographic images to automatically form the panoramic image, the processor comprising a stitching engine to automatically form the panoramic image; and
(d) a memory for storing at least one of the panoramic image and the plurality of still photographic images.

For both aspects, data of the plurality of still photographic images not used in the panoramic image may be deleted upon formation and/or storage of the panoramic image. A first of the plurality of still photographic images may be used to set colour and light related processing for all subsequent images of the plurality of still photographic images. Each of the plurality of still photographic images may have an overlap region with a previous image of the plurality of still photographic images. The overlap region may be determined by at least one of user, pan speed, digital camera processing power, digital camera processing speed, and digital camera shutter speed. The overlap region may be in the range of from 5% to 50%; and each of the plurality of subsequent images may be tagged with a unique sequence number.

In a further aspect there is provided a method for producing a panoramic image using a digital still camera, the digital still camera comprising a photographic imaging system for capturing a plurality of still photographic images to be used to form the panoramic image, the method comprising:
(a) upon the digital still camera being set in a panoramic mode, a shutter release being operated, and the digital still camera being panned, the digital still camera capturing the plurality of still photographic images;
(b) saving each of the plurality of still photographic images in a memory;
(c) automatically processing the plurality of still photographic images in a transfer module to automatically form the panoramic image;
(d) saving at least one of the panoramic image and the still photographic images.

The still photographic images may be deleted from the memory upon the panoramic image being formed and/or stored. The transfer module may be in the digital camera, or in a separate computer to which the plurality of still photographic images have been downloaded. Downloading may be direct, or by use of a removable memory device.

A first of the plurality of still photographic images may be used to set colour and light related processing for all subsequent images of the plurality of still photographic images.

Each of the plurality of still photographic images may have an overlap region with a previous image of the plurality of still images; and the overlap region may be determined by at least one of user, pan speed, digital camera processing power, digital camera processing speed, digital camera shutter speed. The overlap region may be in the range of from 5% to 50%; and each of the plurality of subsequent images may be tagged with a unique sequence number.

The automatic processing may include determining camera orientation and pan direction by determining a plurality of suitable features in two adjacent images of the plurality of still photographic images, the adjacent images having an overlap region; determining the extent of movement of the plurality of suitable features from a first of the adjacent images to a second of the adjacent images; and summing the movements in two different directions. If an absolute sum in a first direction is less than an absolute sum in a second direction, the digital still camera is in a first orientation; and if the absolute sum in the first direction is not less than the absolute sum in the second direction, the digital still camera is in a second orientation. For the first orientation, if the sum in the first direction is less than zero, the pan direction is to the right; and for the second orientation, if the sum in the second direction is less than zero, the pan direction is to the left.

In a final preferred aspect there is provided a method for determining an orientation and pan direction of a digital still camera, the digital still camera having captured a plurality of still photographic images to be used to form a panoramic image, the method comprising:

(a) selecting a plurality of suitable features in two adjacent images of the plurality of still photographic images, the adjacent images having an overlap region;

(b) determining the extent of movement of the plurality of suitable features from a first of the adjacent images to a second of the adjacent images, and;

(c) summing the movements in two different directions.

If an absolute sum in a first direction is greater than an absolute sum in a second direction, the digital still camera is in a first orientation; and if the absolute sum in the first direction is not less than the absolute sum in the second direction, the digital still camera is in a second orientation. For the first orientation, if the sum in the first direction is less than zero, the pan direction is to the right; and for the second orientation, if the sum in the second direction is less than zero, the pan direction is to the left.

The present invention also provides computer usable medium comprising a computer program code that is configured to cause a processor to execute one or more functions for the performance of one or more of the methods described above.

BRIEF DESCRIPTION OF THE DRAWINGS

In order that the present invention may be readily understood and put into practical effect, there shall now be described by way of non-limitative example only preferred embodiments of the present invention, the description being with reference to the accompanying illustrative drawings in which.

DETAILED DESCRIPTION OF PREFERRED EMBODIMENT

Figure 1:
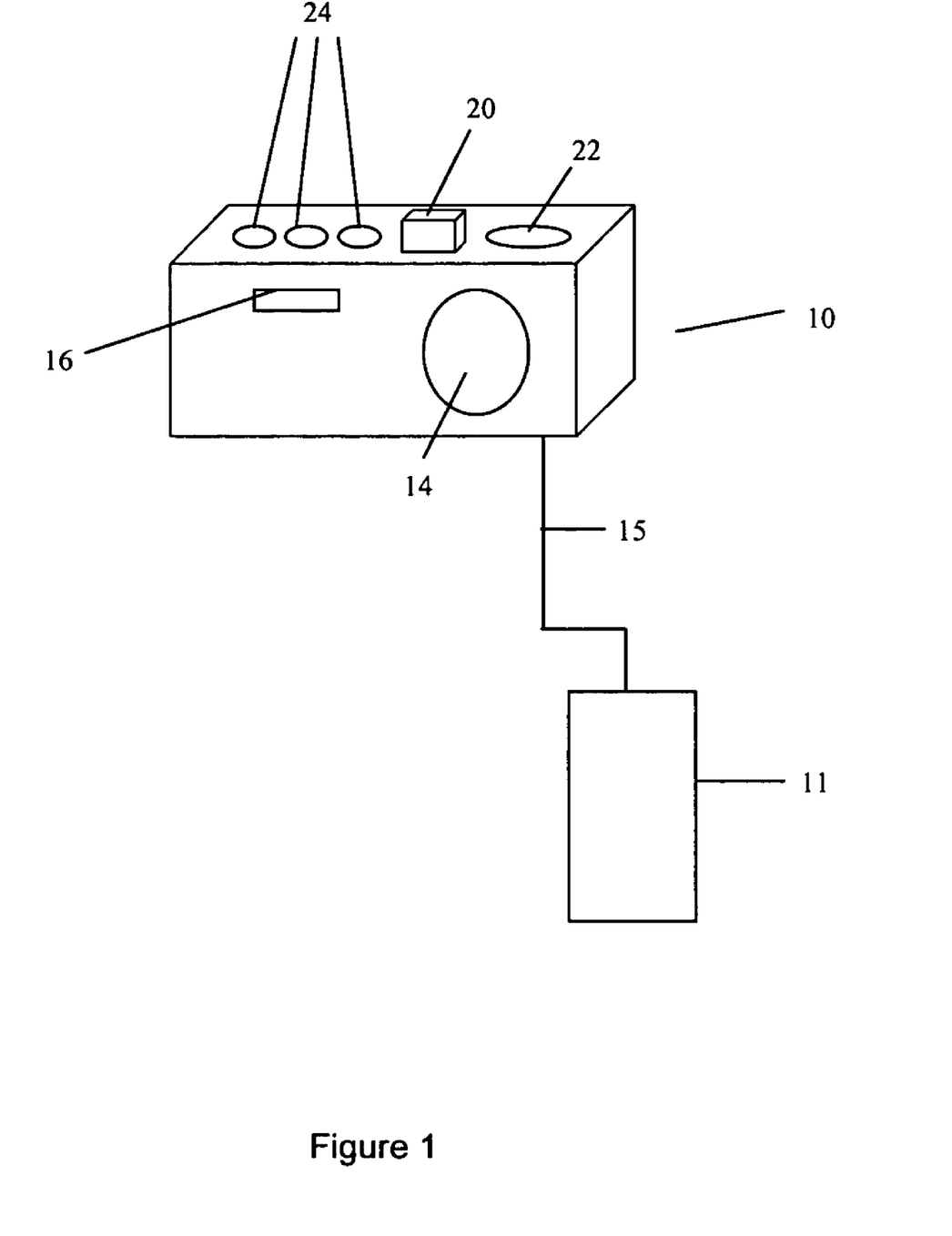
FIG. 1 is a perspective view of one form of digital camera.
Figure 2:
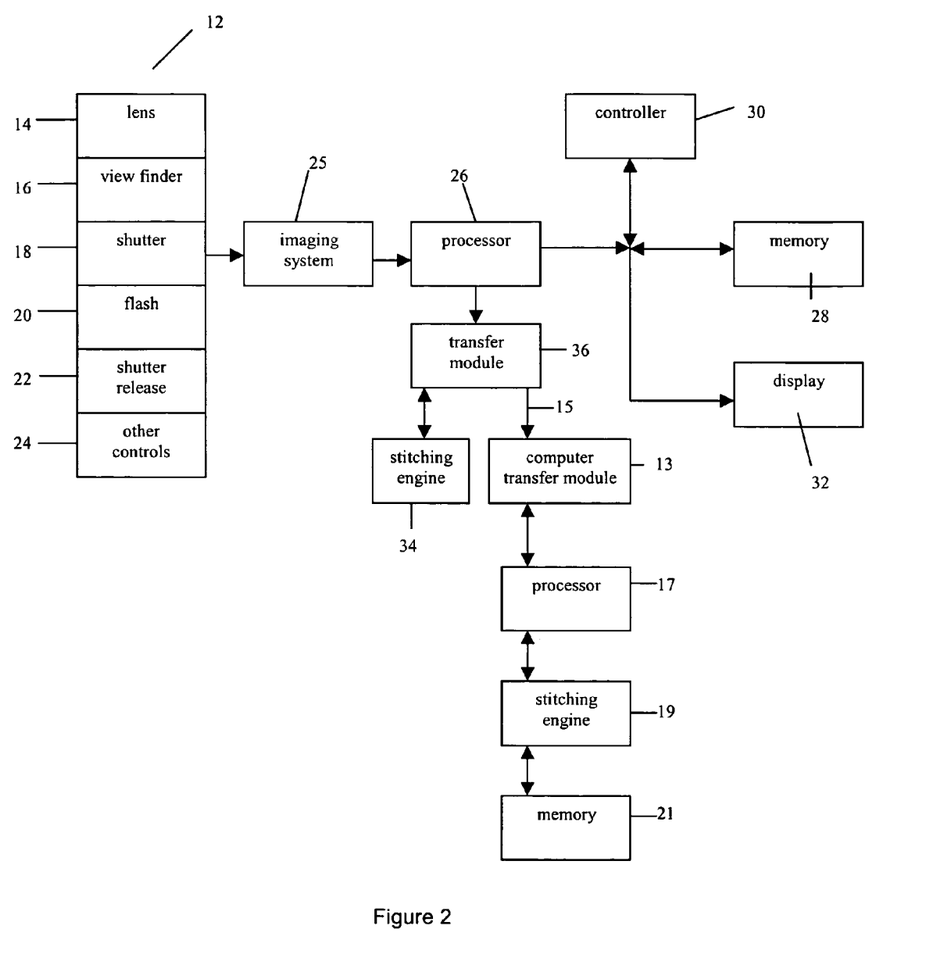
FIG. 2 is a block diagram of the components of the camera of FIG. 1.

To refer to FIGS. 1 and 2 there is shown a digital still camera 10. Although a simple form of digital still camera is shown, the present invention is applicable to all forms of digital still cameras including single lens reflex cameras, and digital motion picture cameras in still camera mode.

The camera 10 has an imaging system generally indicated as 12 and comprising a lens 14, view finder 16, shutter 18, built in flash 20, shutter release 22, and other controls 24. An image-capturing device 25, such as, for example, a charge-coupled device, forms part of the imaging system 12. Within the camera 10 is a processor 26 for processing the image data received in a known manner, memory 28 for storing each image as image data, and a controller 30 for controlling data sent for display on display 32. The image system 12 is able to take and capture photographic images of everyday scenes. The imaging system 12 may have a fixed or variable focus, zoom, and other functions found in digital still cameras.

Figure 5:
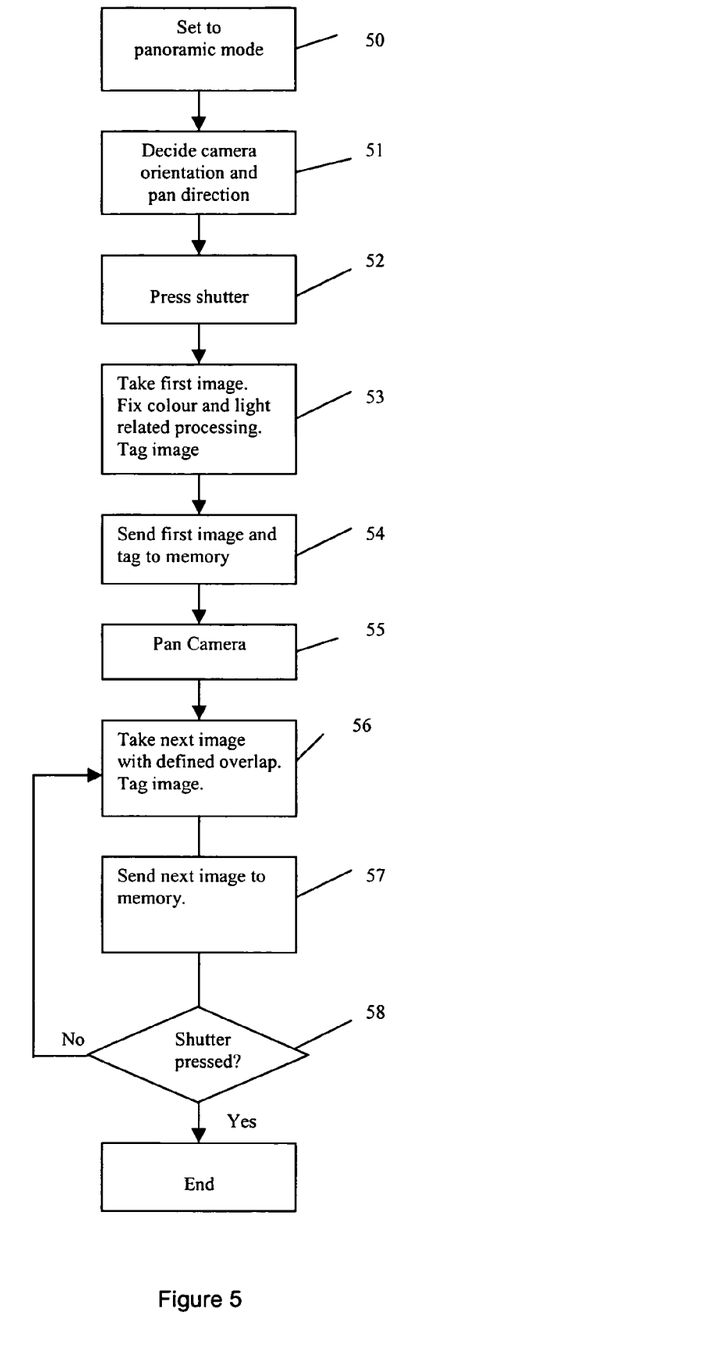
FIG. 5 is a flow chart of a preferred embodiment of the present invention at the capturing stage.

Beginning with the capturing stage shown in FIG. 5, the user first selects a panoramic mode (50). In this mode, like the traditional approach, all colour and light related processing are fixed in the first snapshot to ensure colour consistency (53). In addition, while in the panoramic mode, subsequent snapshots are tagged as a panoramic sequence. The tag also includes a unique number such as for example, a sequence number, which uniquely identifies the sequence and/or the individual snapshot (53).

The user then decides the camera orientation and pan direction (51), and depresses the shutter release (52). The user then pans the camera (55) to span the target scene in a single sweep. The camera automatically takes a snapshot repeatedly at a predefined time interval, for example, every 0.2, 0.5, 0.8, 1.0, 1.5 or 2.0 seconds, and/or with a defined overlap (56). The snapshots are taken at a speed determined by the camera and at a speed such that only a required number of images are taken. This is to prevent such a large number of images being captured that a very high processing power and very large memory is required such as by known cameras that use a "movie" mode. Preferably, only the predefined time interval is used. The rate of taking snapshots may be determined by one or more of pan speed, the amount of overlap of images, camera processing power, camera processing speed, and camera shutter speed. It may be preset. At the end of the scene, the user again depresses the shutter release (58) to indicate the end of the sequence. The camera takes the final snapshot, and the sequence ends (59). The camera increments the sequence number to prepare for the next sequence.

In this simplified process, the user does not need to worry about the overlapping region. The user captures the entire scene in a single continuous sweeping action, and does not need to stop to take each snapshot.

The camera may automatically overlap the snapshots by a predetermined amount such as, for example, in the range of 5% to 50% including, but not limited to, 5%, 10%, 15%, 20% or 50%, to ensure complete capturing of snapshots and to avoid any part of the panorama from being missed. The amount of overlap may be predetermined, user determined, or determined by one or more of: pan speed, camera processing power, camera processing speed, and camera shutter speed.

Instead of a separate stitching application, the stitching engine 34 may reside in a transfer module 36 of the camera 10 or in a transfer module 13 of a computer 11. The transfer module 36 is responsible for transferring the data for the snapshots from the camera 10 to the computer 11 and/or a separate memory module (not shown). Transfer to the computer 11 may be by use of cables 15 in a known manner, or may use of the memory module such as, for example, a flash card or a thumb drive. It is preferably able to detect sequences of images for a panoramic image from other still images by examining the image tag, and passing the sequence of images to form a panoramic image, to the stitcher.

If in the computer 11, the transfer module 13 will have a processor 17 that includes the stitching engine 19. Memory 21 may be part of processor 17, or may be separate.

Figure 6:
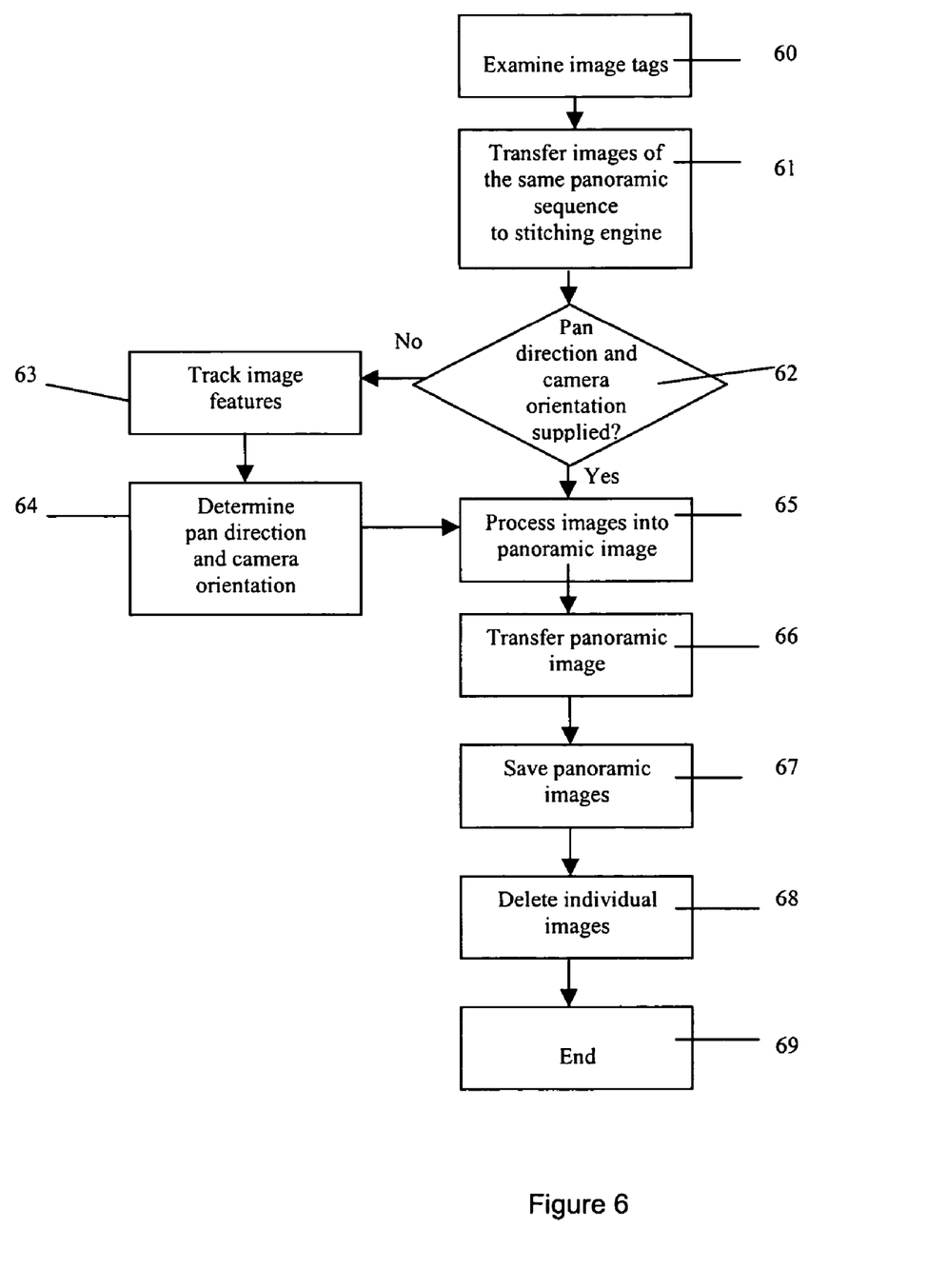
FIG. 6 is a flow chart of the embodiment of FIG. 5 at the download stage.

As shown in FIG. 6, during the image transfer from the camera 10, the transfer module 36 or 13 examines the image tag (60) and automatically transfer or copies each panoramic sequence to the stitching engine 34 or 19 (61) in the correct order. If the camera does not provide the orientation and pan direction (62), the stitching engine 34 or 19 derives it (64) from the image sequence by tracking selected image features (63).

The pan direction and camera orientation estimation (64) assumes that the pan direction and camera orientation are fixed for a given sequence.

Given two images i1, i2, where i1 and i2 overlap:

1. Select suitable features in i1 and track them to i2. Feature selection and tracking may be performed using a known method, such as that described in the article "Good Features to Track" by Jianbo Shi and Carlo Tamasi in IEEE Computer Vision and Pattern Recognition, 1994, the contents of which are hereby incorporated herein by reference. How much the selected features in i1 have moved in i2 is then computed. These movements are summed into two single values SumDeltaX, and SumDeltaY, where SumDeltaX sums the movements in the X-axis, and SumDeltaY sums the movements in the Y-axis.
2. For a reliable result in step 1 above, the number of tracked features should be greater than five. In the event that the number of tracked features is less than five, the tracking accuracy can be increased by making the following assumptions, and performing a specific region search, instead of the general search on the entire image.

Assumption 1: Landscape and Pan Right: Select good features in the right half of i1, and track those features in the left half of i2.

Assumption 2: Landscape and Pan Left: Select good features in the left half of i1, and track those features in the right half of i2.

Assumption 3: Rotate right 90° (Portrait) and Pan Right: Select good features in the top half of i1, and then track those features in the bottom half of i2.

Assumption 4: Rotate right 90° (Portrait) and Pan Left: Select good features in the bottom half of i1, and then track those features in the top half of i2.

Each assumption is tested until the number of tracked features is larger than five before the result of step 1 is acceptable. If for all assumptions the number of tracked features is less than or equal to five, i1 and i2 probably do not overlap at all, in which case the next pair, i2, and image #3, are evaluated.
3. If Absolute(SumDeltaX) is greater than Absolute(SumDeltaY), the camera orientation is landscape. If Absolute(SumDeltaX) is not greater than Absolute(SumDeltaY), the camera orientation is portrait.

For landscape orientation, if SumDeltaX<0, the pan direction is to the right, otherwise it is to the left.

For portrait orientation, if SumDeltaY<0, the pan direction is to the left; otherwise it is to the right.

The stitching engine 34 or 19 processes each panoramic image sequence into a single panoramic image (65) in the normal and known manner. The transfer module then delivers the single panoramic image (66) instead of the image sequence. In such a manner, the user only sees the final stitched panoramic image. The camera 10 or computer 11 does not reveal the panoramic image sequence to the user, and the individual snapshots, or any data sets of the individual snapshots remaining after the stitching operation, may be deleted (68) from memory 26 or 21 during or after the formation of the panoramic image. The individual snapshots, or any data sets of the individual snapshots remaining after the stitching operation, may be deleted upon the completion of that snapshot being stitched into the panoramic image. For the first snapshot, it would be deleted with the second snapshot when the second snapshot was stitched to it.

The panoramic image is saved in memory 28 or 21 (67). The process then ends (69). Therefore, the individual snapshots are either stored in memory and transferred to the panoramic image; or stored in memory and copied to the panoramic image. A memory buffer may be used during the stitching process for storing intermediate warped images. The reference to camera orientation and pan direction is to determine if the camera is in portrait or landscape mode, and panning left or right.

The panoramic image may be displayed on a display of camera 10 or of computer 11. The display may be of the completed panoramic image; or of the first and last images used, or that will be used, to create the panoramic image.

By being in the transfer module 13 or 36, stitching to form the panoramic image takes place when the image sequence is transferred. In this way all stitching of the individual images takes place automatically within the transfer module 13 or 36. When the stitching engine 19 is in the transfer module 13 of the computer 11, the stitching happens automatically on the sequence of images for the panoramic image being downloaded to the computer 11. The panoramic image will not be stored in the camera 10 but will be stored in computer 11, and the sequence of images will be stored in the camera 10.

The present invention also provides computer usable medium comprising a computer program code that is configured to cause a processor to execute one or more functions for the performance of one or more of the methods described above.

Whilst there has been described in the foregoing description preferred embodiments of the present invention it will be understood by those skilled in the art that many variations or modifications in details of design or construction may be made without departing from the present invention.

What is claimed:

1. A digital still camera for taking still images and having a panoramic mode for creating a panoramic image, the camera comprising:

(a) a photographic imaging system for capturing a plurality of still photographic images used to form the panoramic image;

(b) a transfer module for receiving the plurality of still photographic images to be automatically stitched together to automatically form the panoramic image;

(c) a processor for processing the plurality of still photographic images to automatically form the panoramic image, the formation of the panoramic image depending on the processor determining camera orientation and pan direction; and (d) a memory for storing at least one of: the panoramic image and the plurality of still photographic images, wherein the camera orientation and pan direction are determined by the processor for selecting a plurality of suitable features in two adjacent images of the plurality of still photographic images, the adjacent images having an overlap region, the processor determining the extent of movement of the plurality of suitable features from a first of the adjacent images to a second of the adjacent images, and summing the movements in two different directions.

2. A digital camera as claimed in claim 1, wherein the processor comprises a stitching engine to automatically form the panoramic image.

3. A digital camera as claimed in claim 1, wherein data of the plurality of still photographic images not used in the panoramic image is deleted upon storage of the panoramic image in the camera.

4. A digital camera as claimed in claim 1, wherein the transfer module comprises the processor.

5. A digital camera as claimed in claim 1, wherein the transfer module comprises the processor, the processor comprising a stitching engine to automatically form the panoramic image.

6. A digital camera as claimed in claim 1, wherein a first of the plurality of still photographic images is used to set colour and light related processing for all subsequent images of the plurality of images.

7. A digital camera as claimed in claim 6, wherein each of the plurality of still photographic images has an overlap region with a previous image of the plurality of still images.

8. A digital camera as claimed in claim 7, wherein the overlap region is determined by at least one of the group consisting of: user, pan speed, digital camera processing power, digital camera processing speed, digital camera shutter speed.

9. A digital camera as claimed in claim 7, wherein the overlap region is in the range of from 5% to 50%.

10. A digital camera as claimed in claim 1, wherein if an absolute sum in a first direction is greater than an absolute sum in a second direction, the digital camera is in a first orientation, and if the absolute sum in the first direction is not greater than the absolute sum in the second direction, the digital camera is in a second orientation.

11. A system for forming a panoramic image, the system comprising:

(a) a digital still camera for taking still images and having a panoramic mode for creating a panoramic image, the camera comprising a photographic imaging system for capturing a plurality of still photographic images used to form the panoramic image;

(b) a transfer module for receiving the plurality of still photographic images to be automatically stitched together to form the panoramic image, the transfer module comprising a processor;

(c) the processor being for automatically processing the plurality of still photographic images to automatically form the panoramic image, the processor comprising a stitching engine to automatically form the panoramic image, the formation of the panoramic image depending on the processor determining camera orientation and pan direction; and (d) a memory for storing at least one of the panoramic image and the plurality of still photographic images, wherein the camera orientation and pan direction are determined by the processor for selecting a plurality of suitable features in two adjacent images of the plurality of still photographic images, the adjacent images having an overlap region, the processor determining the extent of movement of the plurality of suitable features from a first of the adjacent images to a second of the adjacent images, and summing the movements in two different directions.

12. A system as claimed in claim 11, wherein the transfer module is in a location selected from the group consisting of: the digital still camera, and a computer to which the plurality of still photographic images have been transferred from the digital still camera.

13. A system as claimed in claim 11, wherein data of the plurality of still photographic images not used in the panoramic image is deleted upon storage of the panoramic image.

14. A system as claimed in claim 11, wherein a first of the plurality of still photographic images is used to set colour and light related processing for all subsequent images of the plurality of images.

15. A system as claimed in claim 11, wherein each of the plurality of still photographic images has an overlap region with a previous image of the plurality of still images.

16. A system as claimed in claim 15, wherein the overlap region is determined by at least one of the group consisting of: user, pan speed, digital camera processing power, digital camera processing speed, digital camera shutter speed.

17. A system as claimed in claim 15, wherein the overlap region is in the range of from 5% to 50%.

18. A system as claimed in claim 11, wherein if an absolute sum in a first direction is greater than an absolute sum in a second direction, the digital still camera is in a first orientation; and if the absolute sum in the first direction is not greater than the absolute sum in the second direction, the digital still camera is in a second orientation.

19. A method for producing a panoramic image using a digital still camera, the digital still camera comprising a photographic imaging system for capturing a plurality of still images to be used to form the panoramic image, the method comprising:

(a) upon the digital still camera being set in a panoramic mode, a shutter release being operated, and the digital camera being panned, the digital camera capturing the plurality of still photographic images;

(b) saving each of the plurality of still photographic images in a memory;

(c) automatically processing the plurality of still photographic images in a transfer module to automatically form the panoramic image, the formation of the panoramic image depending on a processor for determining camera orientation and pan direction; and (d) saving at least one of the panoramic image and the plurality of still photographic images in the memory, wherein the camera orientation and pan direction are determined by selecting a plurality of suitable features in two adjacent images of the plurality of still photographic images, the adjacent images having an overlap region, determining the extent of movement of the plurality of suitable features from a first of the adjacent images to a second of the adjacent images, and summing the movements in two different directions.

20. A method as claimed in claim 19, wherein the processing step (c), takes place in the transfer module of the digital still camera.

21. A method as claimed in claim 19, wherein the processing (c) takes place in the transfer module of a computer to which the plurality of images are transferred from the digital still camera.

22. A method as claimed in claim 19, wherein a first of the plurality of still images is used to set colour and light related processing for all subsequent images of the plurality of images.

23. A method as claimed in claim 19, wherein each of the plurality of still images has an overlap region with a previous image of the plurality of still images.

24. A method as claimed in claim 23, wherein the overlap region is determined by at least one of the group consisting of: user, pan speed, digital still camera processing power, digital still camera processing speed, and digital still camera shutter speed.

25. A method as claimed in claim 20, wherein the transfer module comprises a stitching engine for stitching the plurality of still images into the panoramic image.

26. A method as claimed in claim 21, wherein the transfer module comprises a stitching engine for stitching the plurality of still images into the panoramic image.

27. A method as claimed in claim 23, wherein the overlap region is in the range of from 5% to 50%.

28. A method as claimed in claim 19, wherein upon the panoramic image being formed and stored, the plurality of still photographic images are deleted from the memory.

29. A method as claimed in claim 19, wherein if an absolute sum in a first direction is greater than an absolute sum in a second direction, the digital still camera is in a first orientation; and if the absolute sum in the first direction is not greater than the absolute sum in the second direction, the digital still camera is in a second orientation.

30. A method as claimed in claim 29, wherein (a) for the first orientation, if the sum in the first direction is less than zero, the pan direction is to the right; and (b) for the second orientation, if the sum in the second direction is less than zero, the pan direction is to the left.

31. A method for determining an orientation and pan direction of a digital still camera, the digital still camera having captured a plurality of still photographic images to be used to form a panoramic image, the method comprising:
 (a) selecting a plurality of suitable features in two adjacent images of the plurality of still photographic images, the adjacent images having an overlap region;
 (b) determining the extent of movement of the plurality of suitable features from a first of the adjacent images to a second of the adjacent images, and
 (c) summing the movements in two different directions,
 wherein if an absolute sum in a first direction is greater than an absolute sum in a second direction, the digital still camera is in a first orientation; and if the absolute sum in the first direction is not greater than the absolute sum in the second direction, the digital still camera is in a second orientation.

32. A method as claimed in claim 31, wherein
 (a) for the first orientation, if the sum in the first direction is less than zero, the pan direction is to the right; and
 (b) for the second orientation, if the sum in the second direction is less than zero, the pan direction is to the left.

33. A method as claimed in claim 31, wherein the method is performed in a stitching engine in a transfer module in a location selected from the group consisting of: the digital camera, and a computer to which the plurality of still photographic images have been transferred from the digital still camera.

34. Computer usable medium comprising a computer program code configured to cause at least one processor to execute one or more functions for the performance of the method of claim 19.

35. Computer usable medium comprising a computer program code configured to cause at least one processor to execute one or more functions for the performance of the method of claim 31.

* * * * *